(12) United States Patent
Kawamura et al.

(10) Patent No.: US 9,975,056 B2
(45) Date of Patent: May 22, 2018

(54) STEERING STABILIZING APPARATUS FOR A MODEL VEHICLE

(71) Applicant: TRAXXAS LP, McKinney, TX (US)

(72) Inventors: Thomas Michael Kawamura, Plano, TX (US); Wesley Ronald Erhart, Plano, TX (US); Scott Rollin Michael Schmitz, Lewisville, TX (US)

(73) Assignee: TRAXXAS LP, McKinney, TX (US)

( * ) Notice: Subject to any disclaimer, the term of this patent is extended or adjusted under 35 U.S.C. 154(b) by 0 days. days.

(21) Appl. No.: 15/132,183

(22) Filed: Apr. 18, 2016

(65) Prior Publication Data

US 2016/0303485 A1    Oct. 20, 2016

Related U.S. Application Data

(60) Provisional application No. 62/149,514, filed on Apr. 17, 2015.

(51) Int. Cl.
*A63H 17/385*    (2006.01)
*A63H 17/395*    (2006.01)
(Continued)

(52) U.S. Cl.
CPC ........... *A63H 17/395* (2013.01); *A63H 17/36* (2013.01); *A63H 30/00* (2013.01); *A63H 30/04* (2013.01);
(Continued)

(58) Field of Classification Search
CPC ...... A63H 17/36; A63H 17/38; A63H 17/385; A63H 17/39; A63H 17/395; A63H 30/00;
(Continued)

(56) References Cited

U.S. PATENT DOCUMENTS 4,929,949 A * 5/1990 Yamamoto ............. A63H 30/00
                                                     244/190
5,642,281 A * 6/1997 Ishida ...................... B62D 6/00
                                                     180/410
(Continued)

FOREIGN PATENT DOCUMENTS

AU       2014216022 A1    9/2014
EP          2296121 A2    3/2011
(Continued)

OTHER PUBLICATIONS

Ackermann, Jurgen et al., "Automatic car steering control bridges over the driver reaction time", Kybernetika, vol. 33 No. 1, 1997, pp. 61-74.*

(Continued)

*Primary Examiner* — Behrang Badii
*Assistant Examiner* — David A Testardi
(74) *Attorney, Agent, or Firm* — Daryl R. Wright; Greg Carr

(57) ABSTRACT

An electronic system for stabilizing steering of a model vehicle may provide a curvature steering control of an RC vehicle. The approximate curvature control of the RC vehicle determined using error integration to achieve full steering. Application of a leaky integrator may be used to minimize steering memory. The leak factor may be based off gain scheduling of the steering input.

16 Claims, 7 Drawing Sheets

(51) Int. Cl.
| | |
|---|---|
| *B62D 6/00* | (2006.01) |
| *A63H 30/04* | (2006.01) |
| *A63H 17/36* | (2006.01) |
| *A63H 30/00* | (2006.01) |
| *B62D 15/02* | (2006.01) |
| *G05D 1/00* | (2006.01) |
| *G07C 5/00* | (2006.01) |

(52) U.S. Cl.
CPC .......... *B62D 6/003* (2013.01); *B62D 15/025* (2013.01); *G05D 1/0011* (2013.01); *G07C 5/008* (2013.01)

(58) Field of Classification Search
CPC .......... A63H 30/04; B62D 6/00; B62D 6/003; B62D 6/005; B62D 6/008; B62D 15/025
See application file for complete search history.

(56) References Cited

U.S. PATENT DOCUMENTS

| | | | | |
|---|---|---|---|---|
| 5,762,554 | A * | 6/1998 | Siu | A63H 17/395 318/581 |
| 6,088,633 | A * | 7/2000 | Yamamoto | A63H 30/04 318/609 |
| 6,241,574 | B1 * | 6/2001 | Helbing | A63H 30/04 446/454 |
| 6,821,184 | B1 * | 11/2004 | Yeung | A63H 17/395 446/456 |
| 7,610,131 | B2 | 10/2009 | Kojima | |
| 8,154,227 | B1 | 4/2012 | Young et al. | |
| 8,160,816 | B2 | 4/2012 | Kanai et al. | |
| 8,818,571 | B1 * | 8/2014 | Iida | A63H 17/36 446/456 |
| 9,043,029 | B2 | 5/2015 | Seo | |
| 9,320,977 | B2 | 4/2016 | Beard et al. | |
| 2003/0043053 | A1 * | 3/2003 | Schuckel | G08C 17/02 340/13.25 |
| 2004/0016294 | A1 * | 1/2004 | Sugitani | B60T 8/172 73/146 |
| 2005/0003735 | A1 * | 1/2005 | Carter | A63H 30/04 446/456 |
| 2005/0222729 | A1 | 10/2005 | Sakata | |
| 2005/0267661 | A1 * | 12/2005 | Iwazaki | B62D 1/286 701/41 |
| 2006/0052917 | A1 | 3/2006 | Schwarzhaupt et al. | |
| 2006/0071551 | A1 | 4/2006 | Taniguchi et al. | |
| 2006/0085111 | A1 | 4/2006 | Kojima | |
| 2006/0211328 | A1 | 9/2006 | Del Castillo | |
| 2007/0035412 | A1 | 2/2007 | Dvorak et al. | |
| 2008/0026671 | A1 | 1/2008 | Smith et al. | |
| 2008/0167770 | A1 * | 7/2008 | Macdonald | A01B 69/008 701/24 |
| 2008/0251312 | A1 * | 10/2008 | Goto | B62D 6/003 180/446 |
| 2009/0076664 | A1 | 3/2009 | McCabe et al. | |
| 2009/0099735 | A1 | 4/2009 | McCoy et al. | |
| 2009/0222168 | A1 | 9/2009 | Egenfeldt | |
| 2011/0054717 | A1 | 3/2011 | Yamauchi et al. | |
| 2011/0231050 | A1 | 9/2011 | Goulding | |
| 2012/0041658 | A1 | 2/2012 | Turner | |
| 2012/0046856 | A1 | 2/2012 | Doi | |
| 2012/0088436 | A1 | 4/2012 | Grossman | |
| 2012/0130593 | A1 | 5/2012 | Davis et al. | |
| 2012/0179322 | A1 | 7/2012 | Hennessy et al. | |
| 2012/0259479 | A1 | 10/2012 | Yoneta et al. | |
| 2013/0122779 | A1 | 5/2013 | Doherty | |
| 2013/0138266 | A1 | 5/2013 | Koike et al. | |
| 2013/0172060 | A1 * | 7/2013 | Keating | A63H 17/395 463/6 |
| 2013/0207828 | A1 * | 8/2013 | Tanaka | A63H 30/04 341/176 |
| 2013/0226408 | A1 | 8/2013 | Fung et al. | |
| 2013/0226409 | A1 | 8/2013 | Akiyama et al. | |
| 2013/0231814 | A1 | 9/2013 | Sarokhan et al. | |
| 2014/0012469 | A1 * | 1/2014 | Kunihiro | B60W 40/072 701/41 |
| 2014/0143839 | A1 | 5/2014 | Ricci | |
| 2014/0312824 | A1 * | 10/2014 | Beard | G05B 5/01 318/581 |
| 2014/0323013 | A1 | 10/2014 | Gonzalez-Heydrich et al. | |
| 2015/0015376 | A1 | 1/2015 | Jenkins | |
| 2015/0039350 | A1 | 2/2015 | Martin et al. | |
| 2015/0057841 | A1 * | 2/2015 | Hsu | A63H 17/36 701/2 |
| 2015/0094880 | A1 * | 4/2015 | Beard | A63H 17/36 701/2 |
| 2015/0103019 | A1 | 4/2015 | Young | |
| 2016/0306353 | A1 | 10/2016 | Kawamura et al. | |

FOREIGN PATENT DOCUMENTS

| | | | |
|---|---|---|---|
| GB | 2472786 A | * | 2/2011 |
| JP | 11078826 A | * | 3/1999 |
| JP | 2006020652 A | | 1/2006 |
| JP | 2009125212 A | * | 6/2009 |
| WO | WO 90/14980 A1 | | 12/1990 |

OTHER PUBLICATIONS

Dunsmoor, Adam et al. "Senior design project—Gyroscopic vehicle stabilization", Northern Illinois University, ELE 492, Apr. 29, 2013, Google date: Aug. 13, 2013, 17 pages, on the Internet at: https://reipooom.files.wordpress.com/2013/08/project-report-3.pdf.*

Hobby Media blog entry, "HPI Baja 5B D-Box 2 RTR: 2wd buggy in scale 1/5", Mar. 19, 2015, 10 pages, translated from Italian by Google, on the Internet at: http://www.hobbymedia.it/54960/hpi-baja-5b-d-box-2-rtr-buggy-2wd-in-scala-15.*

Li, Qiang et al., "Yaw stability control using the fuzzy PID controller for active front steering", High Technology Letters, vol. 16 No. 1, Mar. 2010, pp. 94-98.*

Song, Jeonghoon, "Design and comparison of AFS controllers with PID, fuzzy-logic, and sliding-mode controllers", Advances in Mechanical Engineering, vol. 2013, Article ID 401548, 2013, 13 pages.*

Wang, Long et al., "Robustly stabilizing PID controllers for car steering systems", Proceedings of the American Control Conference, Philadelphia, Pennsylvania, Jun. 1998, pp. 41ff.*

Wu, Jian et al., "Generalized internal model robust control for active front steering intervention", Chinese Journal of Mechanical Engineering, vol. 28 No. 2, Mar. 2015 (First online: Jan. 30, 2015), 9 pages.*

Astrom, Karl Johan et al., "Feedback Systems: An Introduction for Scientists and Engineers", Version v2.10b (Feb. 22, 2009), Copyright 2009 Princeton University Press, Princeton and Oxford, Chapter 10, pp. 293-314.*

Kahveci, Nazli E., "Adaptive Steering Control for Uncertain Vehicle Dynamics with Crosswind Effects and Steering Angle Constraints", Proceedings of the 2008 IEEE International Conference on Vehicular Electronics and Safety, Columbus, OH, USA. Sep. 22-24, 2008, pp. 162-167.*

International Search Report and Written Opinion by the ISA/EP, dated Jul. 12, 2016, re PCT International Application No. PCT/US2016/028180.

International Search Report and Written Opinion by the ISA/EP, dated Sep. 5, 2016, re PCT International Application No. PCT/US2016/028175.

Spektrum DX3R Pro User Guide, Aug. 2010, (30 pages).

* cited by examiner

*FIG. 7A*
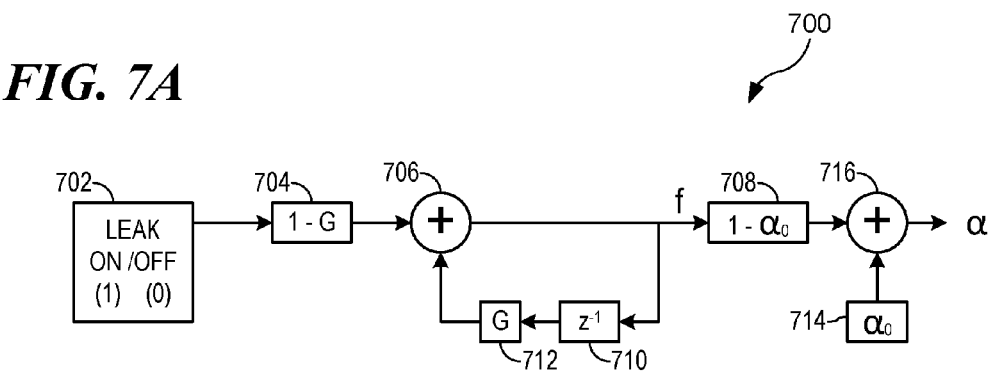
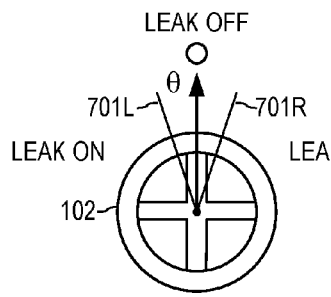
*FIG. 7B*
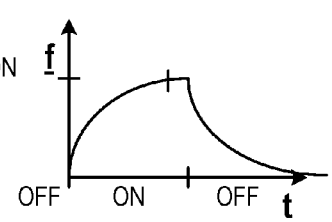
*FIG. 7C*
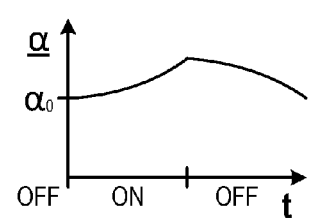
*FIG. 7D*

Figure 8

| First Communication Method |
|---|
| First Control Packet |
| Packet Type |
| Channel |
| Channel 1 Servo Control Value |
| Channel 2 Servo Control Value |
| Channel 3 Servo Control Value |
| Channel 4 Servo Control Value |
| Channel 5 Servo Control Value |
| Failsafe Servo Control Value |
| Expander Data |
|  |
|  |
|  |
|  |
|  |
|  |
|  |
|  |

Figure 9A

| Second Communication Method |
|---|
| Second Control Packet |
| Packet Type |
| Channel |
| Channel 1 user command |
| Channel 2 user command |
| Channel 3 user command |
| Channel 4 user command |
| Channel 5 user command |
| Failsafe user command |
| Expander Data |
| CH1 SR |
| CH2 SR |
| CH3 SR |
| CH4 SR |
| CH5 SR |
| CH1 Trim |
| CH2 Trim |
| Set Button State |
| Menu Button State |
| Multi Function Knob position |

Figure 9B

| Second Communication Method |
|---|
| Third Control Packet |
| Packet Type |
| Channel 1 Low End Point, Byte 0 |
| Channel 1 High End Point, Byte 0 |
| Channel 1 Mid End Point, Byte 0 |
| Channel 2 Low End Point, Byte 0 |
| Channel 2 High End Point, Byte 0 |
| Channel 2 Mid End Point, Byte 0 |
| Channel 1 Low End Point, Byte 1 |
| Channel 1 High End Point, Byte 1 |
| Channel 1 Mid End Point, Byte 1 |
| Channel 2 Low End Point, Byte 1 |
| Channel 2 High End Point, Byte 1 |
| Channel 2 Mid End Point, Byte 1 |
|  |
|  |
|  |
|  |
|  |
|  |
|  |

STEERING STABILIZING APPARATUS FOR A MODEL VEHICLE

CROSS-REFERENCE TO RELATED APPLICATIONS

This application relates to, and claims the benefit of the filing date of, U.S. provisional patent application Ser. No. 62/149,514 entitled STEERING STABILIZING APPARATUS FOR A MODEL VEHICLE, filed Apr. 17, 2015, the entire contents of which are incorporated herein by reference for all purposes.

BACKGROUND OF THE INVENTION

Field of the Invention

The present invention relates to model vehicles and, more particularly, to an electronic system to stabilize steering of the model vehicle.

Description of the Related Art

For a Radio Controlled (RC) Model Vehicle, the Driver controls the vehicle remotely. The RC Driver can only detect the vehicle's motion visually. The RC Driver cannot feel the vehicle's disturbances such as hitting a raised area of earth. The time constants for scaled vehicles are much smaller than the time constants for full sized vehicles. The smaller vehicle responds to disturbances and steering inputs much faster than full sized vehicle.

Electronic steering stability may aid the RC Driver by stabilizing the steering. When steering stability is on, the Driver can focus on larger steering inputs while the electronic steering stability system responds to disturbances around the Driver's steering inputs.

Some systems treat the steering stability as a "driver assist". These controllers add a limited adjustment to the driver's commanded steering input. This assist drives the yaw rate to zero. For forward travel (where the driver commands 0 (zero) steering angle), adjusting for a zero yaw rate may be exactly what the driver wishes. However, when the Driver commands a turn, the Driver may not want a zero yaw rate. For example, an assist system adds counter steer against the driver's wishes. Embodiments of these types of systems typically include well-known gain scheduling strategies to minimize the counter steer as the driver's steering input increases or throttle input decreases. These systems do not provide the right "feel" as the car seems to be disconnected from the driver.

Using said "driver assist" strategy leads to a different issue. In the zero steering input case, the cars heading should be constant. To hold the heading in the face of slight steering bias from driving transverse to a grade or slightly off steering trim, this requires correction based on the integration of the yaw error rate. One such system defines a "heading region" that introduces correction on the integrated yaw error rate when the driver inputs zero steering. This function cannot be active when the driver inputs non-zero steering as the error will integrate, and the assist would hit its limits or, if the limits are wide enough and the gain large enough, this function would counter-steer the car straight. This discontinuity is another example of disconnecting the driver's input from the vehicle—a small input difference on the steering wheel, and the vehicle behaves differently. Therefore the car seems to be disconnected from the driver and the system fails to provide the proper feel.

SUMMARY

An electronic system for stabilizing steering of a model vehicle may provide a curvature steering control of an RC vehicle.

BRIEF DESCRIPTION OF THE DRAWINGS

For a more complete understanding of the present invention and the advantages thereof, reference is now made to the following Detailed Description taken in conjunction with the accompanying drawings, in which:

FIG. 7A is a block diagram illustrating a leaky integrator scheduler;

FIG. 7B is a pictorial representation of steering wheel angle;

FIG. 7C is a graph showing the change in a variable over time;

FIG. 7D is a graph showing the change in a variable over time;

FIG. 8 is a table defining a first control packet between an RC Controller and an RC receiver as used by a first communication method;

FIG. 9A is a table defining a second control packet between an RC Controller and an RC receiver as used by a second communication method;

FIG. 9B is a table defining a third control packet between an RC Controller and an RC receiver as used by a second communication method;

DETAILED DESCRIPTION

Figure 1:
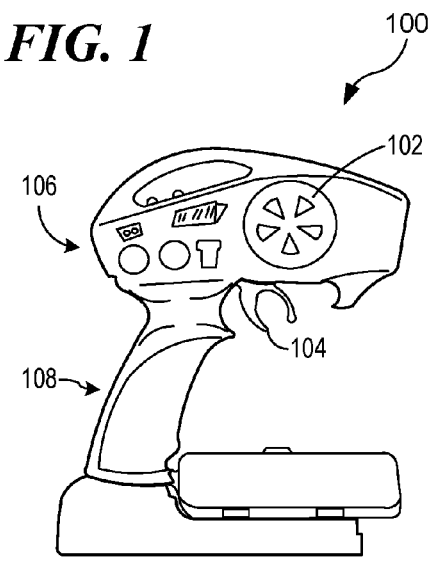
FIG. 1 illustrates a standard RC Controller used for surface model vehicles, such as model cars and model trucks, for example.
Figure 2:
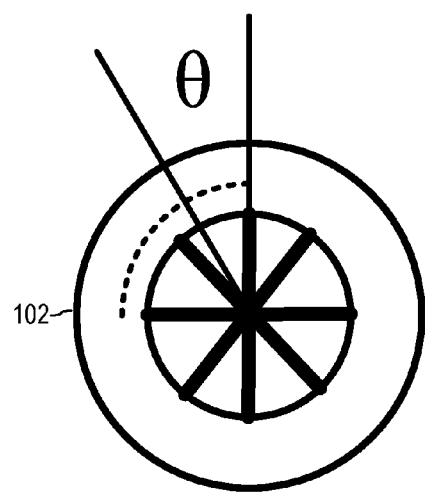
FIG. 2 illustrates the use of a Radio Control (RC) steering control knob (aka "steering wheel")
Figure 3:
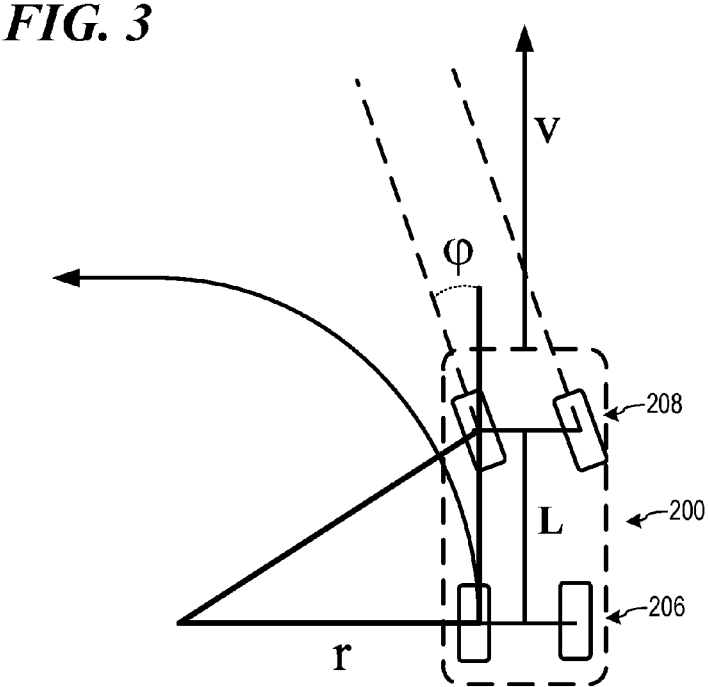
FIG. 3 illustrates a steering angle as applied to a land-based, surface model vehicle.

Turning now to FIG. 1, the reference numeral 100 generally indicates a standard RC Controller used for surface model vehicles, such as model cars and model trucks, for example. The RC Controller may have a least a steering wheel 102 and a throttle trigger 104. The RC Controller may also have a housing 106, which may include a hand-grip handle 108 for grasping the RC Controller. The Driver may use the standard surface RC Controller 100, as shown in FIG. 1, to control a vehicle 200. The RC Driver may command steering input using the steering wheel 102. The RC Driver may command speed and forward/reverse direction using the throttle trigger 104. The RC Driver may thereby produce at least a steering command and a throttle command. The RC Controller 100 may transmit the RC Driver's steering and throttle commands to an RC Receiver in the model vehicle 200 being controlled. With no electronic steering stability, the RC Receiver 202 may simply command a Steering Servo to a corresponding angle to steer the front wheels of the vehicle 200. This is illustrated in FIG. 2 with respect to the RC steering wheel 102 showing a steering wheel angle θ. As shown in FIG. 3, a land-based, ground model vehicle 200 is illustrated as performing a turn. The ground model vehicle 200 may comprise non-steerable wheels 206 and may also comprise steerable wheels 208. The non-steerable wheels 206 and the steerable wheels 208 may be spaced apart by a wheelbase distance L. The ground model vehicle 200 may be travelling in a forward direction at a speed v. In response to an RC Driver's commands, the ground model vehicle 200 may steer the steerable wheels 208 at a steering angle φ and execute a turn having a radius r. With electronic steering stability, the RC Receiver 202 may execute a control system to compensate for disturbances to the ground model vehicle 200, such as hitting a raised area of earth, for example. The RC Driver, operating the ground model vehicle 200 remotely typically cannot feel such disturbances as one would inside a full-size vehicle and may therefore be unable to compensate for such disturbances. The time constants for scaled vehicles are much smaller than the time constants for full sized vehicles. The smaller vehicle responds to disturbances and steering inputs much faster than full sized vehicle. An Electronic Steering Stability (ESS) system 400 may receive inputs from sensors detecting such disturbances, calculate compensating command values, and may command the Steering Servo with the calculated command to control, in the example shown, the Yaw rate to the Driver's commanded rate.

The Electronic Steering Stability (ESS) system 400 may be a feedback control system that uses 6-axis MEMS devices (3 axis of rate Gyros and 3 axis of Accelerometers) and, optionally, a speed sensor. The control system may use common control methodologies such as Proportional-Integral-Differential (PID) error feedback. The primary controlled output may be Yaw rate or, with a speed sensor, turning curvature. The electronic steering stability system may use the steering servo command as the control variable.

The Electronic Steering Stability (ESS) system may be a standard control system that drives the error or difference between the user input (u) and the feedback measurement (y) to zero. This is in contrast to the driver assist strategy, which drives the vehicle's yaw rate to 0 (zero) by counter steering, and typically decreases the assist amount inversely with steering input or vehicle speed, using gain scheduling.

In the case of commanded 0 (zero) curvature (infinite turning radius), a speed sensor, and a PID controller, the result may be a heading-hold gyro, which maintains the current direction of a vehicle, together with linear gain scheduling with inverse of speed. Without a speed sensor, the result may be the functional equivalent of a simple heading-hold gyro.

In the case in which a speed sensor is provided, the user may command a certain curvature (1/r) turn to the right, or to the left. The control system may calculate the difference between commanded curvature and the measured curvature (Yaw Rate/speed). If the difference is positive, the system may command the steering servo to angle the front wheels more in the direction of the turn, to increase the yaw rate. If the difference is negative, the system may command less front wheel angle, to decrease the yaw rate.

Figure 4:
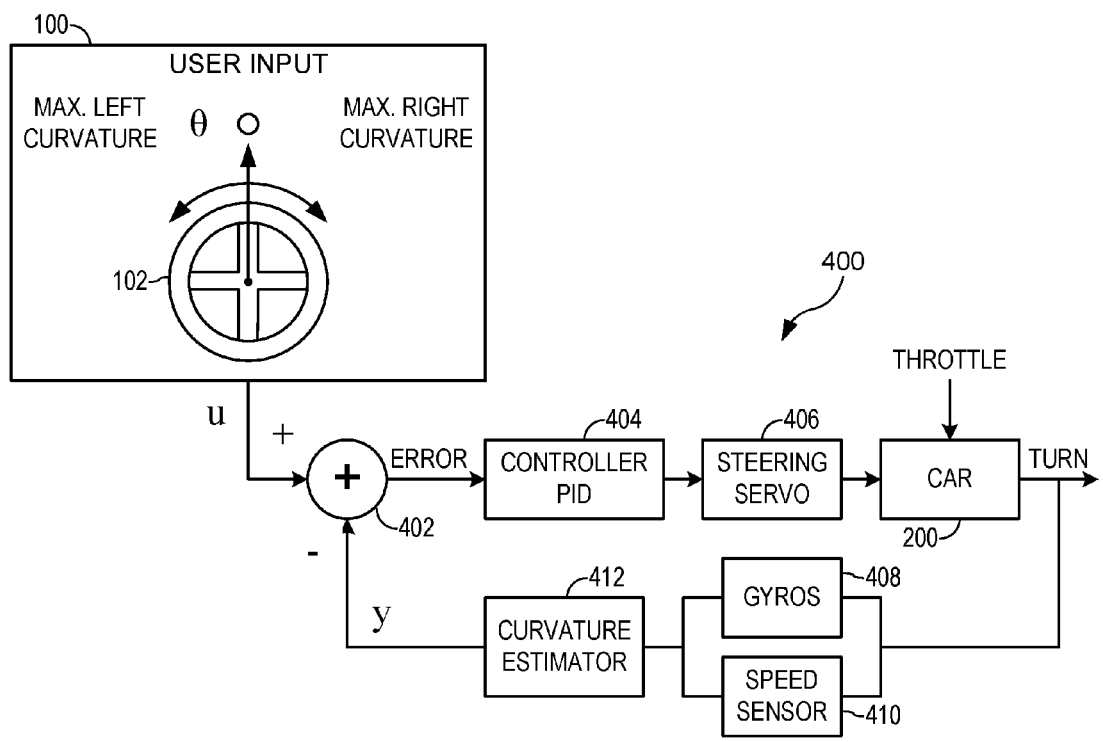
FIG. 4 is a block diagram of a curvature controller.

Turning now to FIG. 4, one aspect of the Electronic Steering Stability (ESS) system 400 may be controlling curvature in a remote control car. This may be accomplished with the inclusion of a speed sensor 410. The speed sensor 410 may be an actual sensor such as an optical flow sensor. The speed sensor 410 may be a fusion or combination of several sensors. An example of this is an extended Kalman Filter fusing accelerometers, gyros, GPS, and the like. to estimate the vehicle's velocity v and the user steering wheel input u directing curvature.

As shown in FIG. 4, the RC Controller 100 may generate user input u by turning steering wheel 102. User input u may be fed to a first input of an adder 402. The adder 402 may generate an error value, which may be fed into PID Controller 404. The output of the PID Controller 404 may be fed into an input of steering servo 406, to command steering angle φ as shown in FIG. 2. The steering servo 406 is well-understood to be a part of the car, or ground model vehicle 200. Together with the THROTTLE input commanding the speed v of ground model vehicle 200, and actuation of steering servo 406 responding to user input u and commanding a steering angle φ, the car, or ground model vehicle 200, may execute a TURN.

The TURN may be detected by Gyros 408, which may be 6-axis MEMS devices having three axes of rate gyros and three axes of accelerometers. A speed sensor 410 may also be provided as described above. Output values representing three axes of rate gyro and three axes of accelerometers may be fed into a curvature estimator 412. The three axes of accelerometers may be used to determine the vector linear acceleration of the vehicle. The curvature estimator 412 may calculate a measured Yaw rate using the Gyros 408 information and vector acceleration of the ground model vehicle 200, as detected by Gyros 408. The curvature estimator 412 may calculate a measured curvature based upon variations in the attitude Yaw rate and vector acceleration of the car, or ground model vehicle 200, as detected by gyros 408, and the speed of the car, or ground model vehicle 200, as detected by speed sensor 410. Curvature may be defined as the reciprocal of the radius r of the turn, or 1/r, and may be estimated by one or more of: Yaw rate and a model of the car at an assumed speed; Gyro rates and linear acceleration using something like a Kalman filter; and Gyro rates and a speed sensor. The curvature estimator 412 may calculate a measured curvature based upon the values of steering angle φ, the speed v of the car, or ground model vehicle 200, and the distance of wheelbase L, as shown in FIG. 2.

The curvature estimator 412 may provide a feedback output value y to a second input of adder 402. The adder 402 may generate an error value based upon user input u and feedback output value y, which may be fed into PID Controller 404 to further control steering of the ground model vehicle 200.

A speed estimate with sufficient accuracy may require more sensors than a 6-axis MEMS sensor. These additional sensors may be expensive and require packaging to ensure crash survivability and water resistance.

Another aspect of the Electronic Steering Stability (ESS) system may be a heading hold system that brings in several aspects of curvature control without requiring a speed sensor. Additionally, the system may include a scheduled leaky integrator coefficient to improve the driver's perceived steering response.

Figure 5:
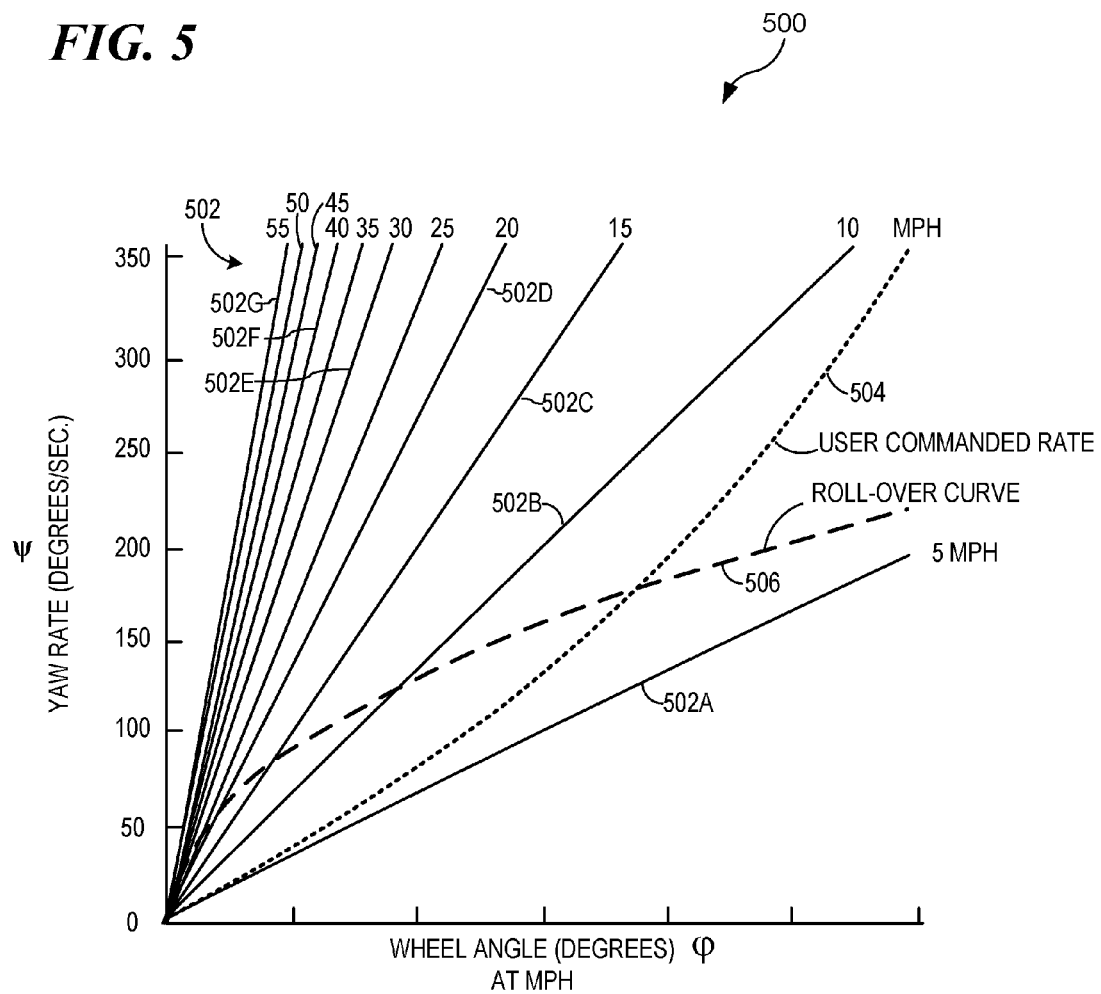
FIG. 5 is a graph illustrating yaw rates compared with wheel angle.

Turning now to FIG. 5, the reference numeral 500 indicates a graph showing several curves of Yaw Rates for an example vehicle of specific wheelbase L. The solid curves 502 are the Yaw Rates in degrees per second as a function of the front wheel angles for different speeds. For example, the solid curve 502A labeled '5 mph' shows the yaw rate of the vehicle increasing from 0 to over 150 degrees per second as the wheel angle increases from 0 to 30 degrees. Curves 502B, 502C, 502D, 502E, 502F, and 502G illustrate the Yaw Rates in degrees per second as a function of the front wheel angles at speeds of 10, 15, 20, 30, 40, and 55 miles per hour (MPH), respectively. Intermediate curves as shown may illustrate the illustrate the Yaw Rates in degrees per second as a function of the front wheel angles at speeds of 25, 35, 45, and 50 MPH. These curves 502 may be considered theoretical or calculated, and may not account for real-world physical phenomena related to servo deflection, tire slip, and the like. For example, as the speed increases, the steering servo is typically unable to hold the front wheels at the commanded angle. Additionally, for example, there is typically more tire slippage in a faster turn, widening the turn (increasing the turning radius) as the speed increases.

If the car speed is fixed at a specific value, in this case 5 mph, a specific Yaw Rate may correspond to a specific curvature. In this example, the curvature may be 0 to 1.5 (1/m) or a turning radius from Infinity to approximately 0.67 m (2.2 feet). Since curvature is Yaw Rate/Speed, the curvature lines vs. wheel angle for every speed are the same for a specific car.

To provide a response without a speed sensor, a commanded yaw rate may be selected that corresponds to a slow speed and tends to ensure that all steering states can be met at any speed. This selection is shown in FIG. 5, Yaw Rates ($\Psi$) as the dotted-line curve 504 labeled "User Commanded Rate". In this case, the X-axis is the steering wheel angle (for a steering wheel that travels between −30 degrees (left, counter-clockwise) and +30 degrees (right, clockwise) where straight is 0 (zero) degrees) and the Y-axis is the corresponding commanded Yaw Rate. For example, if the user turns the steering wheel right (clockwise) by 15 degrees, the user's commanded yaw rate is 127 degrees per second. The commanded rate curve may be an exponential function of the user's input and may fall between the 5 and 10 mph lines for a ⅒th scale vehicle.

The dashed-line curve 506 labeled "Roll-Over Curve" in the graph corresponds to the roll over yaw rate for a specific front wheel angle, and is only an estimate. However, it may be important that the user can command steering over and beyond the yaw rate that rolls the vehicle over. This may allow the user to get full steering capability at slower speeds. The roll-over yaw rate is shown here to give an indication of the range in which the vehicle may operate.

Given the user commanded Yaw Rate and the measured Yaw Rate, a feedback control system may be utilized to steer the car and achieve the desired Yaw Rate. As shown in FIG. 5, if the car is moving too slowly, the commanded yaw rate cannot be achieved. The system may be designed to saturate to full steer in this case.

Contrasting with the typical method of decreasing gain scheduling applied to the steering adjustment, the "driver assist" method decreases the counter steer gain with the driver's steering input. When the driver inputs full steer, the counter steer gain is 0 (zero) and the assist strategy may achieve full steer by not counter steering at all.

The electronic steering stability system may achieve full steer by integrating the error and saturating the servo. The more the user steers in the direction of the turn the quicker the error integrates and the sooner the servo saturates. Even without a speed sensor, the driver may feel more connected to the model vehicle and the vehicle may be perceived to be "doing what it is told" rather than steering against the driver's command.

Figure 6:
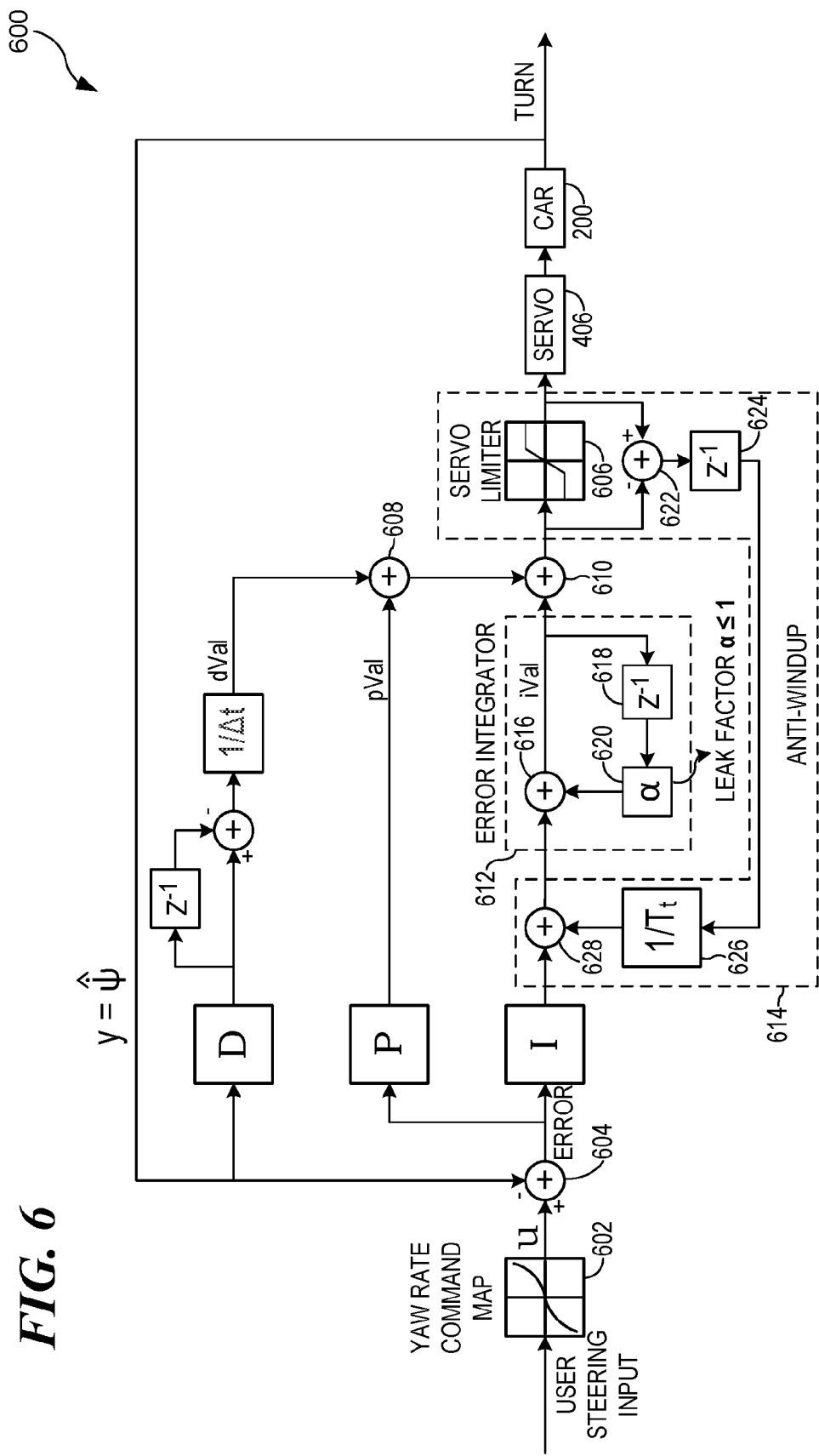
FIG. 6 is block diagram illustrating a control system with no speed sensor.

There are some aspects of the electronic steering stability system that may require special attention. Turning now to FIG. 6, a block diagram illustrates an electronic steering stability system 600 having no speed sensor. To achieve full steering in all situations the error integration may have to reach the servo's saturation point. Typical windup limits, used to prevent excessive overshooting, may not work in situations where a low gain controller is needed. Integral windup refers to the situation in a PID feedback controller where a large change in setpoint occurs, such as positive change, for example, and the integral term accumulates a significant error during the rise (windup), thus overshooting and continuing to increase as this accumulated error is unwound or offset by errors in the opposite direction. The specific problem with integral windup is excess overshooting. (Windup multiplied with the I gain may be less than the full steering command). A well-known anti-windup mechanism may be utilized in this instance. When the integral term, iVal, exceeds the servo's maximum output, a retarding value may be fed back into the integrator.

As shown in FIG. 6, the User Steering Input may be provided to a Yaw Rate Command Map 602, which may operate to determine a particular Yaw Rate from the User Steering Input. User input u may be provided from Yaw Rate Command Map 602 to a first adder 604 to produce an "ERROR" signal. The "ERROR" signal may be provided to integral function I and to proportional function P. The output of integral function I may be subject to further processing, and may then be combined with the output of the proportional function P to produce a Servo Command. The Servo Command may be processed through a Servo Limiter 606 and thereafter be provided to Servo 406 for steering car, or ground model vehicle 200, through a turn. Feedback from the turn may be provided back to adder 604, and to the differential function D. The output of the differential function D may be subject to further processing, and may then be combined at adder 608 with the output of the proportional function P, the result of which may be provided to adder 610. The differential, proportional, and integral terms dVal, pVal, and iVal, respectively, may thereby be combined and may be provided from an output of adder 610 to an input of Servo Limiter 606 for steering the car, or ground model vehicle 200 as described above.

The output of the integral function I may be subject to further processing. In an embodiment, one mode of further processing may be through an Error Integration circuit 612. In an embodiment, one mode of further processing may be through an Anti-Windup circuit 614. The Error Integrator circuit 612 may receive and integral function input at adder 616, which may be provided as the term iVal to an input of adder 610. The iVal signal may be fed back to multiplier 618 for further processing with the reciprocal of a "z" term, the output of which may be provided to multiplier 620 for further processing with leak factor α (alpha). A feedback signal representing Error Integration may be provided to an input of adder 616 for correction of errors in the integral term iVal. The Anti-Windup circuit 614 may combine the input to Servo Limiter 606 with the output of Servo Limiter 606 at adder 622, the output of which may be provided to multiplier 624 for further processing with the reciprocal of the "z" term. The output of multiplier 624 may be provided to multiplier 626 for further processing with the reciprocal of a "T," term. The output of multiplier 626 may be provided to an input of adder 628 for corrections to the iVal term. The Anti-Windup circuit 614 may function to minimize or reduce excessive overshoot of the electronic steering stabilizing system, may create a smoothness in the response of the steering of the ground model vehicle 200 and may contribute to the proper "feel" or responsiveness of the ground model vehicle 200 to the input of the RC Driver.

With just the anti-windup facility, the steering may have "memory" when running slalom courses. Memory steer is the term used to describe a vehicle that continues to pull to the left or right after completing a turn in that same direction. This condition may develop when running courses with constant turns, such as slalom courses, for example. To counter this effect to a desired degree (partially or fully), the integrator may be made "leaky". In mathematics, a leaky integrator equation is a specific differential equation, used to describe a component or system that takes the integral of an input, but gradually leaks a small amount of input over time. A certain amount of error may accumulate in the integral term when the RC Driver commands a harder or tighter turn than the ground model vehicle can respond to. In situations such as these, the integrator may be made to leak so that this error is diminished or "leaks away" and becomes no longer relevant in the calculations. The leaking factor is represented as $\alpha$ (alpha) 620 in FIG. 6. This integrator may leak when $\alpha$ (alpha) is less than 1.

When the model vehicle is commanded with a steering wheel angle of 0 (zero), the leak of the integrator may be turned off ($\alpha$ (alpha) may be set to 1). This may allow the ground model vehicle to overcome any bias in the steering. RC Drivers may like the response of the vehicle to feel smooth. A Leaky Integrator Scheduler 700 as shown in FIG. 7A is a driven difference system that may be used to produce the $\alpha$ (alpha) value. The use of the Leaky Integrator Scheduler 700 may create a smoothness in the response of the steering of the ground model vehicle 200 and may contribute to the proper "feel" or responsiveness of the ground model vehicle 200 to the input of the RC Driver.

As shown in FIG. 7A, a Leak On/Off detector 702 may determine whether the leak of the integrator may be turned off or on. Referring to FIG. 7B, when steering wheel 102 is turned to the right or to the left such that the steering wheel angle $\theta$ exceeds a predetermined limit 701 in either direction, the leak of the integrator may be turned on, otherwise the leak of the integrator may be turned off. More particularly, the leak of the integrator may be turned off when the steering wheel angle $\theta$ is 0 (zero), An On/Off signal may be provided to multiplier 704 where the On/Off signal is multiplied by 1-G where G may be a constant that determines how fast an "f" term rises to 1 or decays to 0. The "f" term may be used to slowly change alpha ($\alpha$) as the driver moves in and out of the leak off and leak on steering angles. The output of multiplier 704 may be provided to an input of adder 706 where it may be summed with output from a feedback loop which may include at least the functions of multipliers 710 and 712. The output of adder 706 may be the "f" term provided to multiplier 708. The "f" term output of adder 706 may also be provided to multiplier 710 where it may be multiplied by the reciprocal of a gain value, "z" which may represent a certain time delay. Multiplier 712 may receive the output of multiplier 710 where it may be multiplied by the constant, G. The output of multiplier 712 may be provided as a feedback signal to adder 706 to correct the "f" term. The output of multiplier 708 may be combined with an $\alpha_0$ term 714 at adder 716 to produce a current $\alpha$ (alpha) value. The alpha ($\alpha$) value of a leaky integrator may be expressed as follows:

$$\alpha = f \cdot (1 - \alpha_0) + \alpha_0.$$

Referring now to FIG. 7C and FIG. 7D, FIG. 7C illustrates turning on the leak for a period of time and then turning it off, and the effect on the f term. When integrator leak is ON, the f term may rise over time, and when the integrator leak is OFF, the f term may decrease over time. In an embodiment, the f term may decrease to zero. FIG. 7D illustrates the resulting alpha ($\alpha$) term over time. When the leak is turned on, alpha rises slowly from an initial value, $\alpha_0$, to 1, noting that at alpha=1, the integrator's leak is off. When the leak is turned off alpha falls slowly to $\alpha_0$, noting that when the integrator's leak is on, $\alpha<1$. In an embodiment, the Leaky Integrator Scheduler 700 may be used to smooth the systems response to the steering changes, and by virtue of the gradually rising or falling of the $\alpha$ (alpha) value, to make a gradual switch between integrator leak being ON and integrator leak being OFF, thereby contributing to smoothness of the steering stabilizing system response. This smoothness may contribute to the proper "feel" or responsiveness of the ground model vehicle 200 to the input of the RC Driver.

Turning now to FIG. 8, a first control packet is shown as used by a first communication method. The first control packet may define one method of communicating information between an RC Controller and an RC Receiver. In a first method, the RC Controller may receive user commands, steering and throttle, for example, and communicate them to the receiver over a first control packet. The user commands of this first method may be combined with the configured properties of each associated RC Controller channel. Such properties may include trim, subtrim and endpoints, for example. The configured properties may be combined with the user commands to produce a single value representing the channel control value. For example, the channel control value for steering may be a combination of the user commanded value, the trim, the subtrim and the endpoints. The channel control value for steering may be communicated to the RC receiver as Channel 1 Servo Control Value as shown in FIG. 8, for example. The RC receiver may then translate the control value into an output for the steering servo, in this example. By combining the properties of the channel with the user command into a single value, the RC receiver may not be able to distinguish between the user command and the configured properties.

Turning now to FIG. 9A, a second control packet is shown as used by a second communication method. This second control packet has been reconfigured to communicate additional information as compared to the first control packet of the first communication method. In this second communication method, additional information such as servo reversing (SR), Trim settings, button states (Set Button and Menu Button, for example), and knob positions may be included in the second control packet. Additionally, a third control packet, as shown in FIG. 9B, may be used in this second communication method. The third control packet may communicate information corresponding to the endpoint settings for a control channel, such as the steering and throttle endpoints, for example. Using this second communication method, the properties of each channel may not need to be combined with the user command. Therefore, the RC receiver may be able to distinguish between the user command and the configured properties. This second communication method may enable the electronic steering stability system 600 previously described to operate as intended without requiring the user to undergo lengthy calibration procedures each time the user may change the trim value associated with an operation channel, for example.

Figure 10:
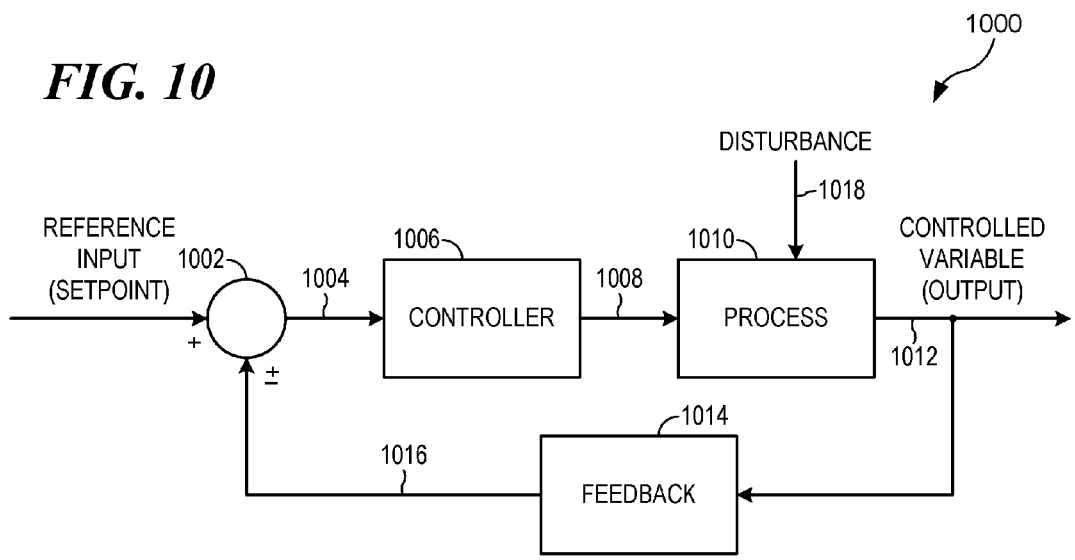
FIG. 10 is a block diagram depicting operation of a feedback control loop.

In the second communication method the additional information may be stored in a memory of the RC receiver. The RC receiver may then use this additional information to result in an improved operation of the electronic steering stability system. Referring now to FIG. 10, the user command for steering may be used as the Reference Input, the Setpoint, for a Feedback Control Loop 1000. The Reference Input may be initially applied to one input of an adder 1002. The adder 1002 may produce an actuating signal 1004 that may be applied to an input of a controller 1006. The controller 1006 may produce a manipulated variable 1008 that may be depend upon multiple inputs representing multiple conditions. The manipulated variable 1008 may be provided to a "Process" 1010. In an embodiment, the Process 1010 may be a steering process for a ground model vehicle. The configured channel properties (trim and sub-trim, for example) may be contained as properties of the Process 1010. The Process 1010 may respond to a disturbance 1018 in the conditions of the vehicle and produce a controlled variable output 1012. The controlled variable output 1012 may be provided to a control device such as a servo, but may also be provided to a feedback system 1014. The feedback system may process the controlled variable output 1012 and provide a feedback signal 1016 to a second input of adder 1002. This may enable the Feedback Control Loop 1000 to more accurately command the vehicle to track the user command for steering.

Figure 11:
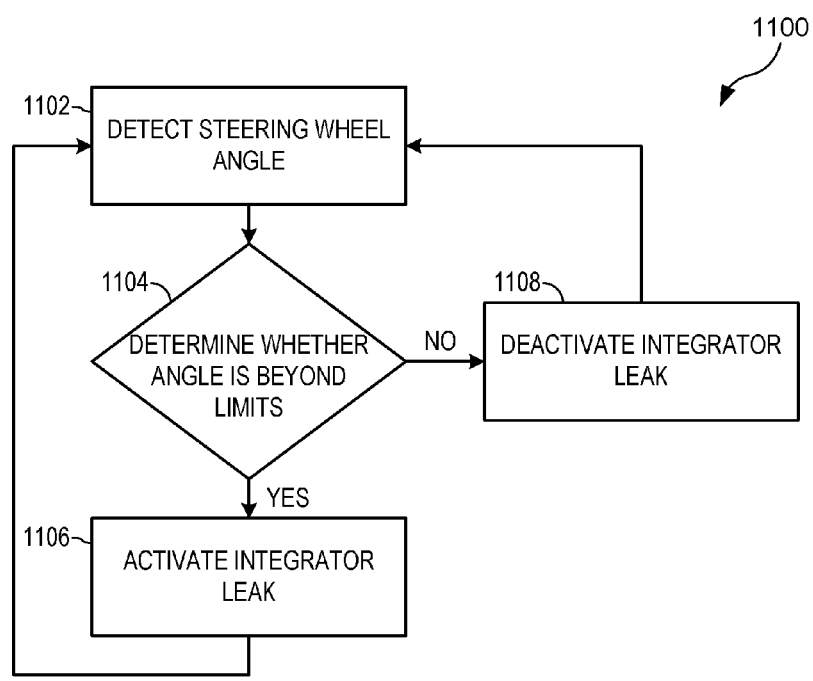
FIG. 11 is a flowchart illustrating a process.

Turning now to FIG. 11, a flow chart illustrates a process 1100 for determining whether to activate the integrator leak or not. At step 1102, the process may detect the steering wheel angle θ and may calculate a steering angle φ. At step 1104, the process may determine whether the steering wheel angle θ is beyond predetermined limits. If the steering wheel angle θ is beyond predetermined limits, in step 1106 the process may activate the integrator leak. If the steering wheel angle θ is within the predetermined limits, in step 1108 the process may deactivate the integrator leak. The process may then return to step 1102 to detect steering wheel angle. As the steering wheel may be turned frequently in certain situations, such as maneuvering the vehicle around obstacles, the process 1100 may be continuously repeated, and may be repeated quite rapidly.

Having thus described the present invention by reference to certain of its exemplary embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of exemplary embodiments. Accordingly, it is appropriate that any claims supported by this description be construed without being limited to the foregoing description.

The invention claimed is:

1. An electronic system for stabilizing a steering of an RC model vehicle, the electronic system comprising:
   a signal generator for generating a commanded curvature corresponding to a user steering command input via a user input interface;
   a rate gyro sensor comprising a 6-axis MEMS device for sensing a measured rotation rate of the RC model vehicle;
   an electronic feedback generator for generating a measured curvature corresponding to the measured rotation rate;
   an electronic adder for generating a curvature error as a function of the commanded curvature and the measured curvature;
   a proportional-integral-differential (PID) controller, wherein the PID controller produces a correction signal corresponding to the curvature error; and
   a steering servo provided in the RC model vehicle and controlled corresponding to the correction signal.

2. The electronic system of claim 1, wherein the electronic feedback generator calculates the measured curvature with an estimated RC model vehicle speed.

3. The electronic system of claim 1, further comprising:
   a linear accelerometer sensor; and
   wherein the electronic feedback generator calculates an estimated RC model vehicle speed based on measurements from the linear accelerometer sensor, the measured curvature is calculated from the estimated RC model vehicle speed.

4. The electronic system of claim 3, wherein the estimated RC model vehicle speed is calculated via an extended Kalman Filter.

5. The electronic system of claim 1, wherein an integral term of the PID controller is further subjected to an anti-windup function in order to produce the correction signal.

6. A method for stabilizing a steering of an RC model vehicle, the method comprising:
   generating a commanded curvature corresponding to a user steering command input via a user input interface;
   measuring a rotation rate of the RC model vehicle via a rate gyro sensor comprising a 6-axis MEMS device;
   generating a measured curvature corresponding to the measured rotation rate;
   generating a curvature error as a function of the commanded curvature and the measured curvature;
   generating a correction signal corresponding to the curvature error via a proportional-integral-differential controller;
   controlling a steering servo in the RC model vehicle corresponding to the correction signal.

7. The method of claim 6, wherein the measured curvature is determined from the estimated RC model vehicle speed.

8. The method of claim 7, further comprising:
   measuring linear acceleration of the RC model vehicle;
   wherein the estimated RC model vehicle speed is calculated based upon the measured linear acceleration and the measured rotation of the RC model vehicle.

9. The method of claim 8, wherein the linear acceleration is measured with the 6-axis MEMS device.

10. The method of claim 8, wherein the estimated RC model vehicle speed is calculated via an extended Kalman Filter.

11. An electronic system for stabilizing a steering of an RC model vehicle, the electronic system comprising:
   a rate gyro sensor for sensing a measured rotation rate of the RC model vehicle;
   an electronic feedback generator for generating a measured curvature corresponding to the measured rotation rate;
   an electronic adder for generating a curvature error as a function of a commanded curvature received by the RC model vehicle and the measured curvature;
   a proportional-integral-differential (PID) controller comprising an error integrator function and an anti-windup function, wherein the PID controller produces a correction signal corresponding to the curvature error by processing an integral term of the PID controller by the error integrator function and the anti-windup function in order to produce the correction signal; and
   a steering servo controlled corresponding to the correction signal.

12. The electronic system of claim 11, wherein the electronic feedback generator calculates the measured curvature with an estimated RC model vehicle speed.

13. The electronic system of claim 11, further comprising:
   a linear accelerometer sensor; and wherein the electronic feedback generator calculates an estimated RC model vehicle speed based on measurements from the linear accelerometer sensor, the measured curvature is calculated from the estimated RC model vehicle speed.

14. The electronic system of claim 13, wherein the estimated RC model vehicle speed is calculated via an extended Kalman Filter.

15. The method of claim 13, wherein the linear acceleration sensor is a 6-axis MEMS device.

16. The method of claim 11, wherein the rate gyro sensor is a 6-axis MEMS device.

* * * * *